United States Patent
Senanayake et al.

(10) Patent No.: US 9,046,917 B2
(45) Date of Patent: Jun. 2, 2015

(54) DEVICE, METHOD AND SYSTEM FOR MONITORING, PREDICTING, AND ACCELERATING INTERACTIONS WITH A COMPUTING DEVICE

(75) Inventors: Rukman Senanayake, San Jose, CA (US); Grit Denker, Palo Alto, CA (US); Patrick D. Lincoln, Woodside, CA (US); Karen L. Myers, Menlo Park, CA (US); Melinda Gervasio, Mountain View, CA (US); Thomas J. Lee, San Francisco, CA (US)

(73) Assignee: SRI International, Menlo Park, CA (US)

( * ) Notice: Subject to any disclaimer, the term of this patent is extended or adjusted under 35 U.S.C. 154(b) by 380 days.

(21) Appl. No.: 13/534,155

(22) Filed: Jun. 27, 2012

(65) Prior Publication Data

US 2013/0311411 A1 Nov. 21, 2013

Related U.S. Application Data

(60) Provisional application No. 61/648,503, filed on May 17, 2012.

(51) Int. Cl.
 *G06N 3/00* (2006.01)
 *G06F 3/01* (2006.01)
(52) U.S. Cl.
 CPC ........................................ *G06F 3/01* (2013.01)
(58) Field of Classification Search
 None
 See application file for complete search history.

(56) References Cited

U.S. PATENT DOCUMENTS

| | | | |
|---|---|---|---|
| 6,323,884 B1 | 11/2001 | Bird et al. | |
| 6,427,192 B1 * | 7/2002 | Roberts | 711/133 |
| 2008/0177726 A1 * | 7/2008 | Forbes et al. | 707/5 |
| 2008/0319827 A1 * | 12/2008 | Yee et al. | 705/10 |
| 2009/0024440 A1 | 1/2009 | Spahn | |
| 2009/0192798 A1 * | 7/2009 | Basson et al. | 704/270 |
| 2009/0307162 A1 | 12/2009 | Bui et al. | |
| 2010/0198768 A1 * | 8/2010 | Zhou et al. | 706/47 |
| 2011/0028138 A1 | 2/2011 | Davies-Moore et al. | |
| 2011/0145051 A1 | 6/2011 | Paradise et al. | |
| 2012/0023226 A1 * | 1/2012 | Petersen et al. | 709/224 |
| 2012/0260181 A1 * | 10/2012 | Sule et al. | 715/736 |
| 2013/0123023 A1 * | 5/2013 | Morita et al. | 463/43 |

OTHER PUBLICATIONS

U.S. Appl. No. 13/399,210 to Senanayake et al., filed Feb. 17, 2012, 44 pages.
U.S. Appl. No. 13/158,109 to Senanayake et al., filed Jun. 10, 2011, 53 pages.
Haines, Will et al., Procedure Editor Design Specification, Apr. 27, 2010, 76 pages.

* cited by examiner

*Primary Examiner* — Kakali Chaki
*Assistant Examiner* — Mai T Tran
(74) *Attorney, Agent, or Firm* — Barnes & Thornburg LLP

(57) ABSTRACT

A device, method and system for monitoring, predicting, and accelerating interactions with a computing device includes determining a current interaction context at a computing device based on interactions occurring at the computing device, predicting a number of potential subsequent interactions, speculatively executing at least some of the potential subsequent interactions, and presenting interactive representations of the speculatively-executed interactions at the computing device.

24 Claims, 8 Drawing Sheets

DEVICE, METHOD AND SYSTEM FOR MONITORING, PREDICTING, AND ACCELERATING INTERACTIONS WITH A COMPUTING DEVICE

CROSS-REFERENCE TO RELATED APPLICATION

This application claims the benefit of and priority to U.S. Provisional Patent Application Ser. No. 61/648,503, filed May 17, 2012, which is incorporated herein by this reference in its entirety.

BACKGROUND

For many people, electronic devices are a constant companion. For others, computing devices (such as laptop or tablet computers, desktop computers, smartphones, and e-readers) may be used relatively infrequently—at their jobs or only to perform a specific task, for example. The human-device experience can be less than optimal for these users and others. Those who use their devices frequently may find bothersome the number of steps or the amount of time it takes to perform a specific task, the repetitive nature of certain operations, or the ease with which typographical errors can be made. More casual users or those who seldom use certain features may additionally suffer from lost efficiency due to the difficulty of remembering how to perform a particular task from one session to the next.

Many traditional computing systems understand only discrete pieces of the "real-world" context in which a person is using a computing device. As a result, traditional systems often lack the capabilities needed to fully appreciate the bigger picture of the person's current experience and use that understanding to improve the human-device interface.

Moreover, when compared with traditional desktop or laptop computers, the human-computer interface offered by many personal electronic devices has limitations. Due to the small amount of real estate available for display screens and controls, and in some cases, limitations of mobile device operating systems and computing power, interacting with a mobile device can be tedious. This can be so, particularly when the interaction requires specifying multiple inputs and/or accessing multiple software applications on the mobile device.

SUMMARY

According to at least one aspect of this disclosure, a method for accelerating user interaction with a computing device includes monitoring a current interaction context of the computing device, where the current interaction context involves at least one current software application. The method also includes predicting a plurality of interactions with the computing device based on the current interaction context, where at least one of the predicted interactions involves a different software application than the current software application. The method also includes at least partially executing the predicted interactions in response to the current interaction context and presenting, at the computing device, a user-selectable representation of each of the at least partially executed predicted interactions.

The current interaction context may relate to at least one interaction with the at least one current software application, and the method may include comparing the at least one interaction with a stored interaction model that includes data relating to a plurality of interactions with software applications. The interaction model may include data relating to a plurality of interaction patterns, which may include at least one of pre-defined interaction patterns, learned interaction patterns generated by a computerized algorithmic learning process, and a plurality of user-specific interactions observed by the computing device. The predicted interactions may include an interaction that involves a software application and at least one parameter or argument, and another interaction involving the same software application and at least one different parameter or argument. One or more of the predicted interactions may include a sequence of multiple interactions that can be executed by the computing device in an automated fashion on behalf of a user.

The method may include at least temporarily suspending the execution of a predicted interaction prior to completing the predicted interaction. The user-selectable representation of one or more of the predicted interactions may be selectable to continue executing the temporarily suspended predicted interaction. The method may include at least partially executing a predicted interaction and at least partially executing another predicted interaction prior to completing execution of the predicted interaction. The method may include receiving a selection of one of the user-selectable representations and repeating the predicting, at least partially executing, and presenting based on the selection. The method may include updating an interaction model based on the selection, where the interaction model includes data relating to a plurality of interactions. The method may include determining an amount of time associated with user performance of at least one of the predicted interactions and at least partially executing the at least one predicted interaction based on the amount of time.

According to another aspect of this disclosure, a computing device includes at least one processor and computer circuitry coupled to the at least one processor, where the computer circuitry is arranged to cause the at least one processor to perform any of the foregoing methods. The computing device may be or include a personal handheld computing device. According to another aspect of this disclosure, at least one machine-accessible storage medium includes a plurality of instructions that in response to being executed result in a computing device performing any of the foregoing methods.

In accordance with a further aspect of this disclosure, a method for learning and accelerating user interaction with a computing device includes maintaining an interaction model that includes data relating to user interactions with the computing device in relation to one or more software applications, monitoring a current interaction context of the computing device, learning an interaction involving one or more software applications, storing data relating to the learned interaction in the interaction model, predicting a plurality of interactions with the computing device based on the current interaction context and the interaction model, at least partially executing the predicted interactions in response to the current interaction context, and presenting, at the computing device, a user-selectable representation of each of the at least partially executed predicted interactions.

The method may include detecting a user-specified beginning of an interaction to be learned and detecting a user-specified end of the learned interaction. The method may include determining, in an automated fashion based on the current interaction context, a beginning and an end of the learned interaction. The method may include generalizing the learned interaction for applicability to interaction contexts that are different from the current interaction context. According to another aspect of this disclosure, a computing device includes at least one processor and computer circuitry coupled to the at least one processor, where the computer circuitry is arranged to cause the at least one processor to perform any of the foregoing methods. The computing device may be or include a personal handheld computing device. According to another aspect of this disclosure, at least one machine-accessible storage medium includes a plurality of instructions that in response to being executed result in a computing device performing any of the foregoing methods.

In accordance with a further aspect of this disclosure, a computing device includes a processor, at least one optical sensor, an output device, and memory coupled to the processor, where the memory has stored therein at least a portion of an interaction model. The interaction model includes data relating to user interactions with the computing device in relation to one or more software applications. The memory also has stored therein at least one computer-executable module configured to monitor a current interaction context of the computing device, where the current interaction context is defined at least in part by information derived from the at least one optical sensor. The at least one computer-executable module is also configured to, based on the current interaction context, predict a plurality of interactions with the computing device, where each interaction involves at least one software application, at least partially execute the predicted interactions in response to the current interaction context, and present, at the output device, a user-selectable representation of each of the at least partially executed predicted interactions.

The at least one computer-executable module may be configured to update the predicted interactions in response to information derived from the at least one optical sensor. The information derived from the at least one optical sensor may relate to implicit behavior of a person with respect to the computing device, where the implicit behavior involves a portion of the person not explicitly interacting with the computing device. The at least one computer-executable module may be configured to modify the presentation of user-selectable representations based on the implicit behavior. The computing device may be or include a personal handheld computing device.

BRIEF DESCRIPTION OF THE DRAWINGS

This disclosure is illustrated by way of example and not by way of limitation in the accompanying figures. The figures may, alone or in combination, illustrate one or more embodiments of the disclosure. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
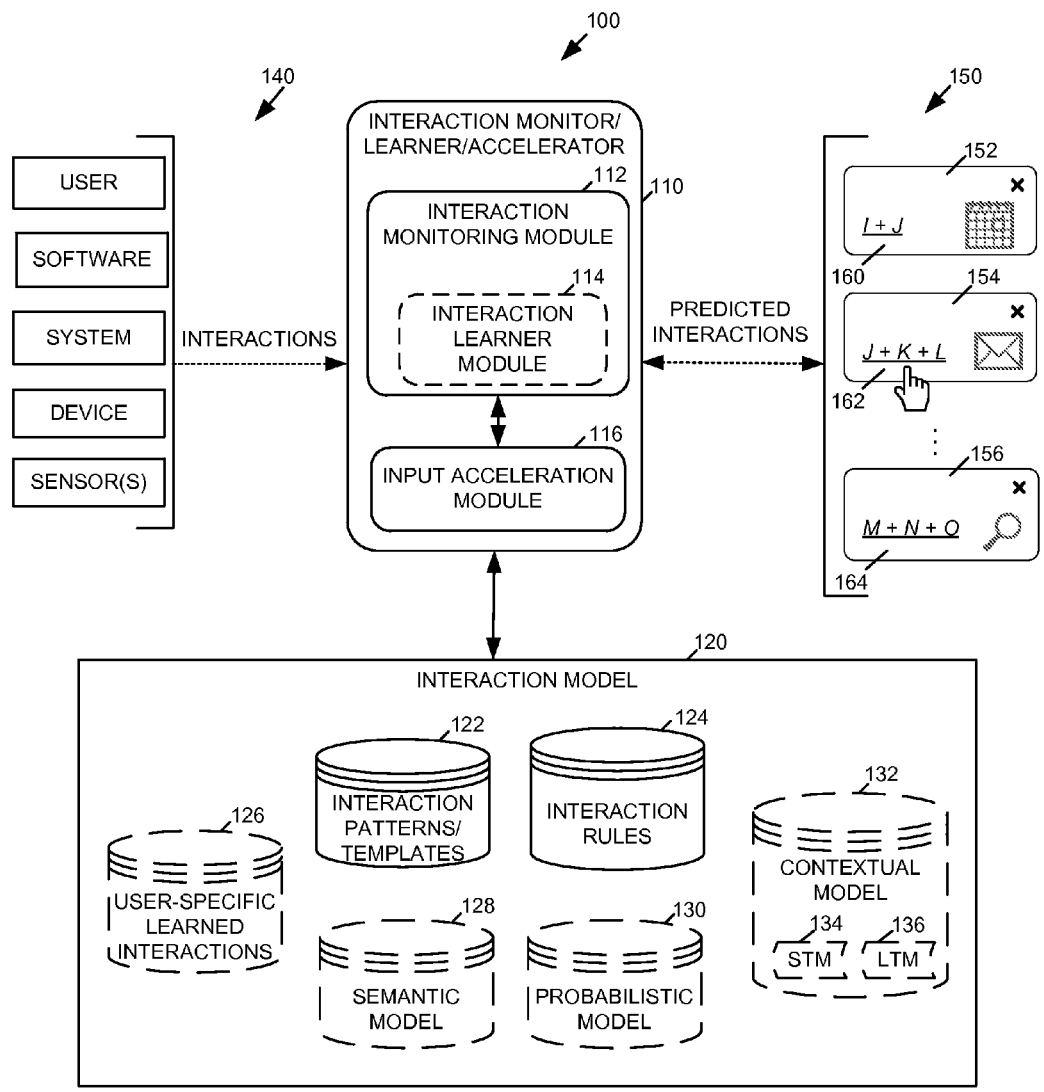
FIG. 1 is a simplified module diagram of at least one embodiment of a system for monitoring, learning, predicting, and accelerating interactions with a computing device.

While the concepts of the present disclosure are susceptible to various modifications and alternative forms, specific embodiments thereof are shown by way of example in the drawings and are described in detail below. It should be understood, however, that there is no intent to limit the concepts of the present disclosure to the particular forms disclosed, but on the contrary, the intention is to cover all modifications, equivalents, and alternatives consistent with the present disclosure and the appended claims.

Overview

Referring to FIG. 1, a system 100 for monitoring, learning, predicting, and accelerating interactions with a computing device includes an interaction monitor/learner/accelerator module ("interaction accelerator") 110. As explained in greater detail below, the illustrative interaction accelerator 110 monitors a current interaction context of the computing device, which is defined at least in part by a number of interactions 140 with the computing device. The interactions 140 can include a combination or series of actions performed by the user with the computing device, as well as automated events that involve various software applications running on the computing device, systems software, device hardware and/or sensors that may be in communication with the computing device.

The interaction accelerator 110 includes an input acceleration module 116, which interfaces with an interaction model 120 to predict a number of interactions or series of interactions with the computing device that may logically follow a given interaction or series of interactions 140 that have recently occurred at the computing device, in view of the current interaction context. The input acceleration module 116 begins executing at least some of the predicted interactions in a speculative fashion; that is, without definitively knowing which of the predicted interactions might actually be desired by the user to be performed next. Predicted interactions can be speculatively executed to completion or only up to an intermediate point at which the interaction requires user input or approval.

Each of the at least partially-executed predicted interactions (e.g., 152, 154, 156) is captured or "iconified" as an interactive representation 150. Any of the representations 150 can be selected by a user of the computing device to continue or cancel the execution of the corresponding predicted interaction or series of subsequent interactions.

A sequence of predicted interactions with the computing device may be designed by the interaction accelerator 110 to accomplish a particular task or achieve a potentially desirable end result on behalf of the user. The predicted interactions may involve different software applications or combinations thereof. In the illustrative example, the predicted interactions 152, 154, 156 may each include a corresponding combination or sequence of individual interactions (e.g., user-supplied actions or automated events) 160, 162, 164. For instance, the predicted interaction 152 may involve an interaction "I" followed by an interaction "J," and may be related to the creation of a new calendar appointment using calendar software running on the computing device. The predicted interaction 154 may involve inputs from the interaction "J," which may be incorporated into subsequent interactions "K" and "L," and may be related to the creation of a reply email message using electronic mail software on the computing device. The predicted interaction 156 may involve a series of interactions "M," "N," and "O," which may involve the same or different inputs than the predicted interactions 152, 154, and may be related to an online search for documents or information that may be conducted at the computing device.

Any or all of the interactive representations 150 may be presented to the user concurrently and/or in a logical sequence. For instance, representations 150 corresponding to predicted interactions that involve executing the same or similar tasks with different inputs may be presented concurrently, while representations 150 corresponding to predicted interactions that involve inputs derived from prior interactions may be presented sequentially or in a successive order.

In this way, the system 100 uses the current interaction context of the computing device to predict and speculatively pre-execute subsequent interactions that may be desired by or helpful to the user. Further, the system 100 intelligently determines appropriate inputs for predicted interactions based on the current interaction context, thereby reducing the number of inputs needing to be manually supplied by the user and further "accelerating" the user's interactions with the computing device.

Referring still to FIG. 1, the interactions 140 are analyzed by an interaction monitoring module 112, in the illustrative embodiment. While shown in FIG. 1 as a sub-module of the interaction accelerator 110, the interaction monitoring module 112 may be a separate module that operates relatively independently from the interaction accelerator 110. For instance, in some embodiments, the interaction monitoring module 112 may continuously monitor and analyze the interactions 140 (e.g., as they occur) and post interaction data to the interaction model 120, such that the interaction accelerator 110 need only interface with the interaction model 120 to determine the current interaction context and predict subsequent interactions.

In some embodiments, an interaction learner module 114 executes a process by which the system 100 learns interactions that a user may find helpful to have automated, e.g., those that may be repetitive in nature or frequently conducted in response to certain triggering events. Such learned interactions may be stored in the interaction model 120 and performed by the computing device in an automated fashion at a later time, e.g., in response to the then-current interaction context. In this way, the system 100 can continuously improve its understanding of the current interaction context of the computing device and thereby predict next interactions more intelligently.

Further details regarding the interaction model 120 are described below, following a discussion of some of the types of interactions that may be monitored by various embodiments of the system 100. Further details regarding the interaction monitoring module 112 are discussed below with reference to FIG. 4. In addition, some exemplary techniques for learning interactions by the system 100 are discussed below with reference to FIG. 4. Additional details regarding the input acceleration module 116 are described below with reference to FIGS. 5-8. An illustrative example of a computing device that may be used in connection with the system 100 is shown in FIG. 9, described below.

Interaction Monitoring

The interaction monitoring module 112 analyzes and categorizes or classifies the various interactions 140 of which it becomes aware in one or a number of different ways. In some embodiments, the interaction monitoring module 112 creates associations between or among interactions 140 that may appear to be related or logically connected in some way, based on the current interaction context. For example, some interactions 140 may be associated with one another as a combination or logical sequence of interactions according to spatial proximity (e.g., relative closeness of position on a display screen), temporal proximity (e.g., closeness in time of performance/execution), frequency of occurrence, recency of occurrence, and/or other factors. Some interactions 140 may be classified based on a particular software application, type of software application, or combination of software applications or modules that are involved in the interaction (e.g., an integrated email/calendar/contacts application vs. a web browser vs. a real-time text messaging application). Some interactions 140 may be classified based on semantic meanings associated with certain aspects of the interaction (e.g., an email message may be classified as a "meeting request" based on semantic information associated with content that appears in the body of the message). In some embodiments, interactions 140 may be annotated with information that indicates the order or position of the interaction within a larger sequence or combination of interactions. As another example, some interactions 140 may be classified according to whether the interaction is initiated by a user, by a software application, or by some other component of the computing device. Results of the interaction monitoring module 112's monitoring and analysis of the interactions 140 are stored in the interaction model 120 and may be used by the interaction accelerator 110 to determine the interaction context of the computing device at any given point in time.

Figure 2:
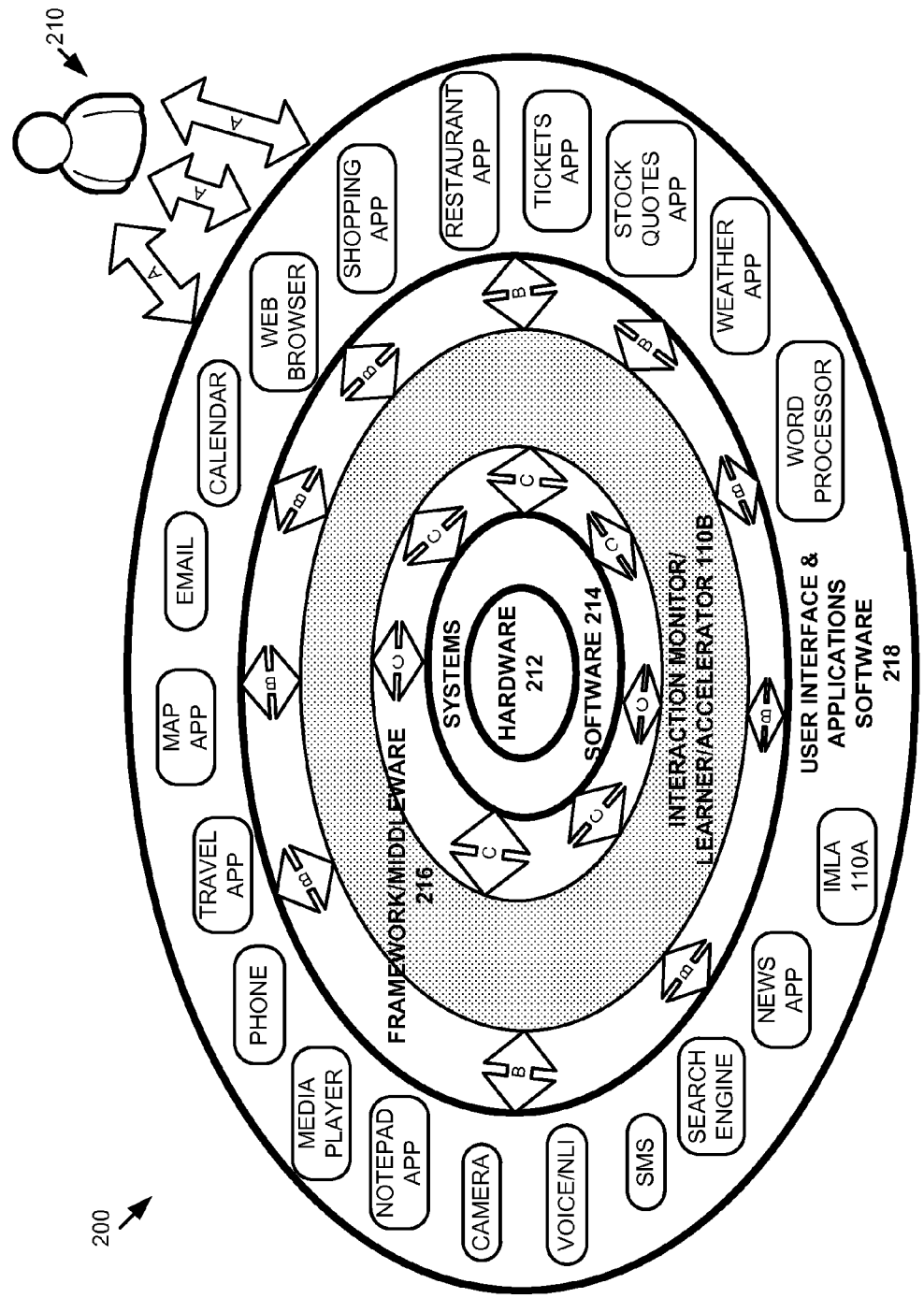
FIG. 2 is a simplified illustration of at least one embodiment of the system of FIG. 1 in the context of an illustrative computing environment.

Referring now to FIG. 2, an illustrative embodiment 200 of the system 100 includes a computing device having hardware 212 (e.g., processor, memory, input-output subsystems, peripheral devices, etc.), systems software 214 (e.g., operating systems, device drivers, inter-process communication (IPC) mechanisms, etc.), framework/middleware 216 (e.g., application programming interfaces or APIs, object libraries, etc.), and user interface and applications software 218. The user interface and applications software 218 may include a variety of different kinds and types of software applications or user-level (e.g., "client") portions thereof. Some illustrative examples of user interface and applications software 218 include graphical user interface operating system front ends, "office" or personal productivity applications (e.g., word processors, spreadsheets, slide presentation software, calendars, contacts, task lists, etc.), web-based or mobile device applications (e.g., web browsers, search engines, travel or restaurant research and reservation applications, ticket ordering and purchasing applications, map and driving direction applications, online shopping applications, weather, stock quotes, and news applications), communication applications (e.g., email applications, phone, text messaging, and voice/natural language interfaces), multimedia applications (e.g., still camera, video camera, music player, video player), and/or others.

Each of the interactions 140 may include one or a number of different types of atomic user actions and/or application- or system-level events "A," "B," and/or "C." As such, the term "interaction" may refer to singular actions or events, or combinations, sequences or series thereof, which may be directed to the completion of a particular task, objective, or result that may be desired by the user of the computing device. Interactions "A" represent interactions of a user 210 with one or more features or aspects of the user interface and applications software 218 running on the computing device. Some examples of user interactions "A" include opening a document, sending an email message, following a hyperlink, and entering a search query. In general, the interactions "A" of the person 210 with the system 100, 200 may be of a variety of different types. For example, the interactions "A" may involve the input or selection of content or data (e.g., creating an email message, filling in an online form, selecting an item from a list of choices), the activation or deactivation of application-level controls (e.g., save document, send email), and/or the manipulation of user interface objects (e.g., moving a scroll bar, cursor, or mouse pointer, resizing a window, relocating an icon).

The user interactions "A" may be explicit (or "active"), or implicit (or "passive"). Some examples of explicit or active interactions include certain gestures (e.g., "swipe," "tap," "drag"), and other methods of physically contacting a keyboard, keypad, mouse, touchscreen, hardpanel control or other input mechanism of the computing device (e.g. to activate a user interface control, enter or select data, or select a displayed option).

Some examples of implicit or passive user interactions "A" include interactions that may be detected by one or more sensors or other peripheral components of the computing device, such as optical sensors, proximity sensors, accelerometers, and/or others. For instance, optical sensors may detect that a person's eyes are focused on a particular area of the display screen without the person explicitly interacting with the computing device. Similarly, proximity sensors may detect movement of a portion of the user's body (e.g., hands, arms) toward or away from a particular portion of a touch-sensitive display screen, without the person explicitly interacting with the display screen. Accelerometers may detect changes in the manner in which the user is holding or carrying the computing device.

As the arrows "A" are bidirectional, interactions "A" also represent interactions (i.e., user-level software application events) of the user interface and applications software 218 with the user 210. Some examples of software interactions "A" include displaying an email notification, displaying a fill-in form, and displaying search results.

Interactions "B" represent user-level software application events and/or communications with the framework/middleware 216 and vice versa, which may be responsive to interactions "A" and/or interactions "C." Interactions "C" represent system-level events and/or communications with the framework/middleware 216 and vice versa, which may be responsive to interactions "A" and/or interactions "B."

As should be appreciated by those skilled in the art, user-level interactions "A" are generally converted by the various user interface and applications software 218 to a form "B" that can be understood by the framework/middleware 216 and/or systems software 214. As a simple example, the user-level interaction of activating a "send" button in a user interface window that includes an email message addressed to John may be converted by the user interface and applications software 218 to a "SendMail(Msg1, IPAddressforJohnsComputer)" command that can be understood by the framework/middleware 216 as the functional equivalent of the user-level command corresponding to "send email message to John."

Through the use of an API, object libraries, and/or other mechanisms, the framework/middleware 216 may convert the "SendMail" command to a form "C" that can be understood by the systems software 214. The systems software 214 may convert the programming code created by the framework/middleware 216 to machine-level instructions that can be executed by the hardware 212.

As an example, in some embodiments of the system 100, 200, the hardware 212 may include one or more optical sensors (e.g., one-way or two-way cameras), proximity sensors, a global positioning system (GPS) transceiver, a microphone, and/or other sensors or peripheral components. The systems software 214 may handle the GPS data, images, or other information detected by the sensors or peripheral components and translate it to a form "C," which can be converted by the framework/middleware 216 to a form "B," which can be used by one or more of the user interface and applications software 218. Any of the foregoing types of interactions "A," "B," "C" and/or others may be of interest to, and therefore monitored, analyzed, and processed by, the interaction accelerator 110 (or a component thereof, e.g., 110A or 110B, described below) at any given point in time, depending on the current interaction context and/or requirements of a particular design or implementation of the system 100, 200.

In the embodiment 200, the interaction accelerator 110 includes a "front end" or "client" portion, interaction monitor/learner/acceleration module (IMLA) 110A and a "back end" or middleware/framework portion, interaction accelerator 110B. The illustrative IMLA 110A is part of the user interface and applications software layer 218 of the system 200, while the illustrative interaction accelerator 110B is part of the framework/middleware layer 216. As such, the IMLA 110A can interface with a person 210 using the system 200, with user interface and applications software 218, or with systems software 214, to monitor and interpret interactions "A" or "B" initiated by the person 210 or the software 218, to monitor and interpret interactions "C," to present the representations 150, and/or perform other operations that may be related to the person 210 or the software 218 interacting with the system 200.

In some embodiments, interactions "A" and/or "B" may be initially captured and/or processed by the IMLA 110A or by instrumented user-level software applications such as any of those illustrated in the user interface and applications software layer 218 and/or others. Generally speaking, "instrumenting" an application refers to the use of programming code to interface with a software application for the purpose of monitoring the activity of the software application at runtime and reporting data relating to that activity to a log file or database, for example. For instance, in some embodiments, individual user-level software applications can be instrumented so that upon executing interactions determined to be of interest, data pertaining to the type of interaction conducted (e.g., create new email message) and arguments and/or parameters associated with the interaction (e.g., addressee, subject, content/body) are reported by the instrumented software application to, and stored in, the interaction model 120.

In other embodiments, the interaction accelerator framework/middleware 110B may, alternatively or in addition, periodically query any one or more of the individual user interface and applications software 218 or systems software 214 directly to obtain the desired interaction data and then report the information to the interaction model 120 (using, e.g., a "push" data transmission paradigm wherein data is posted to the interaction model 120 automatically as it occurs or on a periodic basis, or a "pull" data transmission paradigm wherein data is posted to the interaction model 120 in response to requests from the interaction model 120).

In some embodiments (e.g., irrespective of whether individual software applications are instrumented), the interaction accelerator 110B is configured to monitor, analyze and process interactions "B" and/or "C" in addition to interactions "A." This enables the interaction accelerator 110B to monitor interactions involving different software applications at the same time. In addition, hardware or system-level interactions "C" that involve one or more of the user interface and applications software 218 can be monitored, analyzed, and processed by the interaction accelerator 110B. Thus, in some embodiments, the interaction accelerator 110B can, through the execution of computing logic, make inferences about the current interaction context based on sensor data (e.g., interactions "C") and interaction data collected from the user interface and applications software 218 (e.g., interactions "A" and/or "B").

For instance, based on inputs from optical sensors integrated with a computing device, the interaction accelerator 110B may derive information about the location of the user's current attention relative to other portions of the display screen. The interaction accelerator 110B may query one or more of the user interface and applications software 218 or use other mechanisms (such as the "semantic visualization" model discussed below) to gather additional information about what is then being displayed on the computing device at the location of the user's gaze, and/or what functions are currently being performed by the user interface and applications software 218. Combining the gaze information with other details (e.g., interactions "A" and/or "B," or other information about the content displayed at the location of the user's gaze), the interaction accelerator 110B may conclude, for example, that the user is working in a particular software application, that a notification generated by the computing device is not receiving the user's attention, or that something displayed at a particular location on the display screen may be important to the user in the current context.

The interaction accelerator 110B may predict subsequent interactions based on these and other similar combinations of information. As one example, the interaction accelerator 110B may determine (e.g., via sensor data) that the user is currently looking at a specific portion of the display screen (e.g., a specific part of an email message), and then analyze the content displayed at the location on the display screen that corresponds to the user's gaze. Based on that analysis, the interaction accelerator 110B may store portions of the analyzed content, along with an association with the current context, in the interaction model 120 for current and/or future use.

As another example, the interaction accelerator 110B may generate a predicted next interaction involving the creation of a new calendar appointment that incorporates content displayed at the location of the user's recent focus (e.g., subject, attendees, location), and instantiate those details in the predicted interaction. Or, the interaction accelerator 110B may, in a predicted interaction, use recently looked-at content to automatically fill in the fields of a online form (e.g., by automatically copying the looked-at content and inserting it in the appropriate fields), thereby leaving the user with only the task of reviewing and approving the automatically filled-in form.

As a further example, the system 100 may generate inferences based on sensor data in combination with other interaction information, and store those inferences in the interaction model 120 in the form of templates or rules. For instance, sensor data may indicate that the user's attention is currently turned to a web browser application. Based on previously executed sequences of interactions, probabilistic data, previously defined templates or rules, etc., the system 100 may conclude that the user's probable next actions relate directly to content that was viewed very recently by the user on the computing device. In analyzing the recently-viewed content in view of the interaction model 120, the system 100 may generate one or more of the following predicted interactions: (a) follow a hyperlink to a web address contained in a recently viewed document (e.g. email); (b) conduct a web search on a recently viewed phrase (or image); or (c) visit a social media site to access information about a person whose name or address was recently viewed (e.g. the addressee or sender of an email). Similarly, if the user browses a web page containing interactive fields to be filled out (e.g. a restaurant reservation site), a template or rule may indicate to the system 100 that the user's probable next actions include copying recently viewed text (e.g. proper names, addresses, dates, etc.) and entering it into corresponding fields of the form. In these and other ways, the system 100 can, using the interaction model 120, analyze content that has had the user's attention very recently on the computing device and automatically copy and incorporate the recently viewed content into candidate next interactions.

As another example, the systems software 214 may detect an incoming email message via a network interface of the computing device. Data relating to the incoming message may be relayed to an email application 218 as interactions "C." Pre-cognitively to the user, the interaction accelerator 110B may automatically characterize the incoming email message as a meeting request (e.g., based on message content and/or other aspects of the current interaction context of the computing device gleaned from the interaction model 120) and automatically generate a calendar appointment incorporating the message content as a predicted interaction. In this example, the interaction accelerator 110B is able to predict a next interaction that alleviates the need for the user to attend to an incoming email message and manually transfer information from the message to a calendar appointment.

In these and other instances, the interaction accelerator 110B can analyze and process interactions "C" relaying information from the systems software 214 or the hardware 212, and also analyze and process interactions "B" of the corresponding user interface and applications software 218 with the framework/middleware 216, which may be responsive to the interactions "C" (and vice versa), to obtain an even greater understanding of the current interaction context of the computing device.

Interaction Model

Referring further to FIG. 1, the illustrative interaction model 120 includes one or more indexed or otherwise searchable stores of knowledge (e.g., databases, lookup tables, or the like) 122, 124, 126, 128, 130, 132, 134, 136, which contain data relating to interactions with a computing device. In general, each of the stores of knowledge 122, 124, 126, 128, 130, 132, 134, 136 is configured for keyword, text, and/or meta data searching and sorting of the interaction data in a number of ways using currently available techniques (or similarly suitable later-developed techniques). The interaction data includes associations with user-level characterizations of the interactions, so that interactions can be understood at a high level, or linked or associated with one another based on a user-level understanding of the interaction (e.g., even if the program code required to execute the interactions at a lower level is ambiguous or different). For example, "open email message" may be the user-level characterization associated with both an interaction involving a web-based email program and an interaction involving a desktop email client (even though the commands used by these programs may be different), or "edit the 2012 report" may be the user-level characterization associated with an "OpenDoc(rpt.doc)" interaction with a word processing application.

The illustrative interaction patterns and/or templates knowledge store 122 includes patterns of interactions and/or interaction templates that have been previously established. Some examples of previously-established patterns and/or templates include sequences of interactions that the user has explicitly taught or "trained" the computing device how to do using automated learning by demonstration technology. The knowledge store 122 may also include stored interaction patterns and/or templates that have been similarly created by other persons, such as system administrators or other users. Some examples of learning by demonstration technology and its application to workflow or task automation are described in U.S. Patent Application Publication No. 2009/0307162 to Bui et al., which is incorporated herein by this reference. The system 100 is by no means limited to such techniques; other similarly suitable methods may be used equally as well.

Interaction patterns and/or templates may be established and/or prioritized based on any suitable criteria for determining the relevance of an interaction to the current context, such as the recency or frequency of the interactions, historical usage patterns, usability analyses, crowd-sourcing, and/or other methods. As a simple example, if studies show that when a population of users receives a notification of a new email message, the next most likely next interaction according to that population is that the user opens the new email message, then a "receive email notification→open message" may be stored as a pre-defined interaction pattern or template in the knowledge store 122.

However, if a particular user has established an interaction pattern or template (e.g., via learning by demonstration technology) in which a probable sequence of interactions involves, for example, moving the incoming message to an "unread mail" folder instead of opening the message, then the interaction model 120 may be likely to consider the user's own interaction pattern as more relevant to the current interaction context than the crowd-sourced interaction pattern. In general, many different factors can be used to determine the degree to which a particular interaction pattern or template may be relevant to the current interaction context. Those factors that are more personal to the user may be considered to be of potentially greater significance. Both the interaction patterns and/or templates and indicators of their relevance to the current interaction context may be stored in the interaction model 120, or more particularly, the knowledge store 122.

The illustrative interaction rules knowledge store 124 includes data that may be used by the interaction accelerator 110 to monitor, learn, predict, speculatively execute, and/or present the predicted next interactions to the user. In some embodiments, the interaction rules knowledge store 124 may include rules that pertain to the monitoring and/or learning of interactions. For example, rules may be defined and stored in the knowledge store 124 that can be used to determine whether a particular monitored interaction is more or less relevant (or irrelevant) to a current interaction context. In addition, the knowledge store 124 may include rules that help the system 100 determine when to initiate and conclude interaction learning.

In some embodiments, the knowledge store 124 may specify limits for the number of next interactions to predict, speculatively execute, or present, based on various aspects of the current interaction context. As another example, the knowledge store 124 may specify limits on "how far" to speculatively execute a predicted interaction. For instance, if a predicted interaction involves sending an email, entering personal information, or agreeing to a purchase, or other activity that typically requires the user's approval, the knowledge store 124 may include rules that permit the predicted interaction to execute in an automated fashion up to a point that requires the user's approval.

In some embodiments, interactions learned by the interaction learner module 114 are stored in the user-specific learned interactions knowledge store 126. The illustrative knowledge store 126 may include data relating to interactions with the computing device that the particular user of the computing device has "taught" the computing device implicitly through observation by the interaction monitoring module 112, as discussed below.

In some embodiments, a semantic model knowledge store 128 associates semantic information with interactions and/or the associated arguments and parameters. The semantic information may include the user-level characterizations of interactions mentioned above, as well as associations between or among interactions, arguments, parameters, and aspects of the current interaction context that enable the system 100 to better understand what the user is seeing and/or doing with the computing device at a given point in time at a high level.

As an example, when a user accesses content using a web browser, semantic information associated with the actual content viewed by the user may be stored in the semantic model 128. For instance, rather than simply recording that the user opened a web browser and followed a particular URL, the system 100 may obtain semantic information associated with the particular web page (where the content has been previously tagged with such information, using a markup language such as HTML, XML, RDF, or OWL). Such semantic information may provide further details about the content actually displayed by the web browser at a particular point in time.

Figure 3:
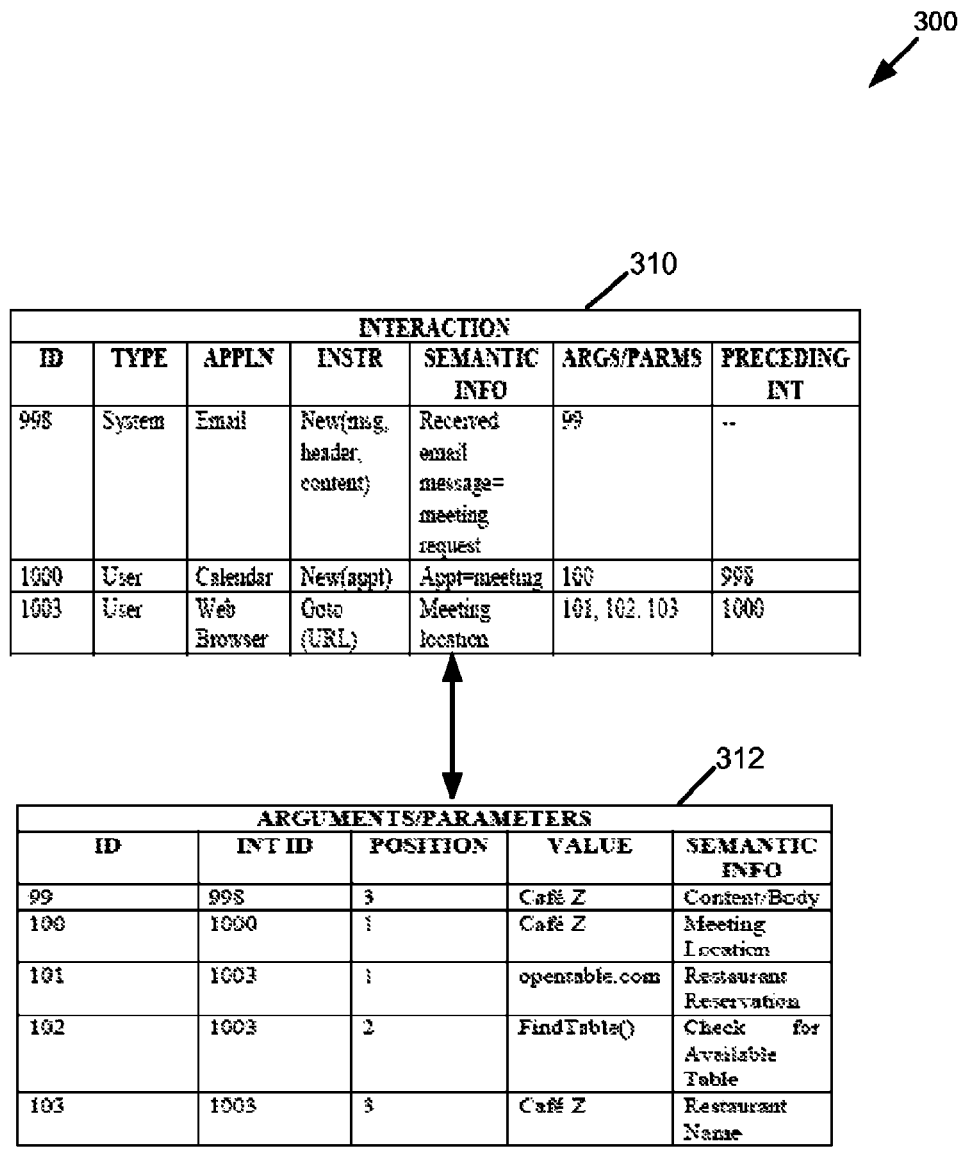
FIG. 3 is a simplified diagram of an exemplary data model that may be used in connection with at least one embodiment of the system of FIG. 1.

As another example, parameters and/or arguments may have different semantic meanings depending on the context in which they are used. For instance, as shown in FIG. 3, in the context of an email message, the argument "Café Z" may simply be a topic that was mentioned in the body of the email message, but in the context of a calendar appointment, the argument "Café Z" may indicate the location of a meeting, and in the context of a restaurant reservations software application, "Café Z" may indicate the name of a particular restaurant at which the user desires to make a reservation. Such associations of semantic information with particular arguments and/or parameters of an interaction are stored in the semantic model 128, in some embodiments.

In some embodiments, the semantic model 128 includes a "semantic visualization" mechanism by which the interaction accelerator 110 is able to determine what content is displayed at particular locations on a display screen of a computing device at which the user's gaze may be focused, without, potentially, resorting to instrumented applications. Some examples of content that can be detected and analyzed by the semantic visualization mechanism include text, graphics, images, and interactive user interface elements such as buttons, knobs, fill-in form fields, scroll bars, and the like.

In some embodiments, screen-scraping and/or other technologies may be used to determine content displayed at a particular location (e.g., x-y coordinates) on the display, while gaze tracking technology mentioned elsewhere herein may be used to identify the on-screen location(s) to be analyzed. The semantic model 128 then associates semantic meanings with the content identified by the semantic visualization mechanism. For example, if the semantic visualization mechanism determines that the user is focusing on a "send" button shown on the display screen, the semantic model 128 may associate semantic information such as "email message sent" with the interaction. Thus, in some embodiments, detailed information about visually-displayed content that currently has the user's attention and its semantic meaning is collected, analyzed, and stored in the interaction model 120 for use in determining the current interaction context.

In some embodiments, a probabilistic model knowledge store 130 includes data relating to the likelihood or probability that certain interactions logically follow other interactions and/or the likelihood or probability that certain interactions may be desired to be executed with certain combinations of arguments or parameters. For instance, where a calendar interaction follows a view email message interaction, the system 100 may infer (based, e.g., on the pre-defined interaction patterns/templates 122, the user-specific learned interactions 126, the user's past history or frequency of performing similar interactions, etc.) that the next logical interaction is to create a new calendar appointment using information contained in the email message. Further, the specific information to be pulled from the email message and incorporated as inputs into the calendar appointment may be informed by the probabilistic model 130. For instance, the interaction accelerator 110 may have recently concluded, based on gaze tracking and "semantic visualization" inputs, that it is highly likely that a proper noun that the user was staring at on the display is the name of a restaurant that corresponds to the desired location of the meeting, and may update the probabilistic model 130 accordingly. Based on the high likelihood of the association of the stared-at proper noun with the meeting location (as determined by the interaction accelerator 110), the proper noun may be instantiated as the meeting location in the calendar appointment.

However, if information in the email message is ambiguous, the system 100 may generate a number of possible subsequent interactions using various permutations of the ambiguous information. As an example, if the subject line of the email message includes the word "Paris," the system 100 may generate a number of predicted interactions, including a calendar appointment with John Paris as an attendee, another calendar appointment specifying Paris, France as the location, and yet another calendar appointment specifying "the Paris, Ill. factory" as an agenda item. The probabilistic model knowledge store 130 may contain information that enables the system 100 to determine (e.g., based on past interactions, current context information, etc.) that, of the three predicted interactions, creating a calendar appointment with John Paris as an attendee is the most likely desired next interaction. As described in the aforementioned U.S. Patent Application Publication No. 2009/0307162 to Bui et al., a Logical Hidden Markov Model is one example of a probabilistic model. The present disclosure is in no way limited to that technique; rather, any similarly suitable probabilistic model(s) may be used.

In some embodiments, a contextual model 132 stores information relating to real-time interactions with the computing device, e.g., interactions that are monitored by the interaction monitoring module 112. In some embodiments, the contextual model 132 includes a short term memory (STM) model 134 and a long term memory (LTM) model 136, which organize past interactions according to their temporal proximity to the current interaction context.

In general, interaction data is initially stored in the STM 134 and then transferred to the LTM 136 as it ages. In some embodiments, an assumption is made that information in the STM 134 is the most relevant to the current interaction context; however, information in the LTM 136 may also be considered pertinent. For instance, the LTM 136 may be considered more relevant for users who use the computing device or a particular feature thereof more infrequently. Rules for determining when interaction data has aged sufficiently to initiate a transfer from the STM 134 to the LTM 136, or for determining the extent to which the STM 134 and/or LTM 136 may be used to influence the current interaction context, can be configured for individual users and/or according to the requirements of a particular design or implementation of the system 100, and stored in the interaction model 120 (e.g., in the rules knowledge store 124).

Referring now to FIG. 3, an illustrative data model 300 for at least a portion of the interaction model 120 is shown. The data model 300 includes an interaction knowledge store 310 and an arguments/parameters knowledge store 312. The illustrative interaction knowledge store 310 includes data relating to interactions, such as an associated software application, an indication of whether the interaction was initiated by the user or the system, the program instruction, command, function or procedure involved in the interaction, user-level semantic information associated with the interaction, the arguments and/or parameters associated with the interaction (or a reference or pointer thereto), and an indicator of the preceding interaction (or a reference or pointer thereto). The illustrative arguments/parameters knowledge store 312 includes data relating to arguments and/or parameters (e.g., input data values, function calls, procedures, variables, etc.), user-level semantic information, and a reference or pointer to the interaction(s) with which the particular arguments or parameters are associated.

The interaction knowledge store 310 and arguments/parameters knowledge store 312 are associated with one another according to a many-to-many relationship paradigm. In other words, the data model 300 contemplates that interactions can be executed multiple times with different combinations of parameters and arguments, and that the same parameters and arguments may be relevant to multiple different interactions (albeit with different semantic meanings, potentially). As a result, interactions can be generalized for applicability to multiple various interaction contexts (e.g., using different arguments and/or parameters), and interactions involving specific combinations of arguments or parameters can be analyzed for applicability to the current interaction context. In addition, the illustrative data model 300 includes associations between interactions and preceding interactions. Accordingly, in the illustrative embodiment, potential next interactions can be identified based on the preceding interactions data.

In the specific example shown in FIG. 3, the interaction knowledge store 310 contains data relating to an interaction that is made up of a series of atomic interactions, including a notification of a new email message (generated by an email application of the computing device), followed by an opening of a new calendar appointment by the user, followed by use of a web browser by the user to visit and use a restaurant reservation software application to make a reservation at a restaurant whose name appeared in the body of the email message and in the location field of the calendar appointment. The gaps between the numbers identifying the interactions (e.g., IDs 998, 1000, 1003) illustrate that, in some embodiments, intervening non-relevant interactions may be ignored or discarded by the system 100 (e.g., during interaction monitoring and/or analysis).

Interaction Learning and Acceleration

Figure 4:
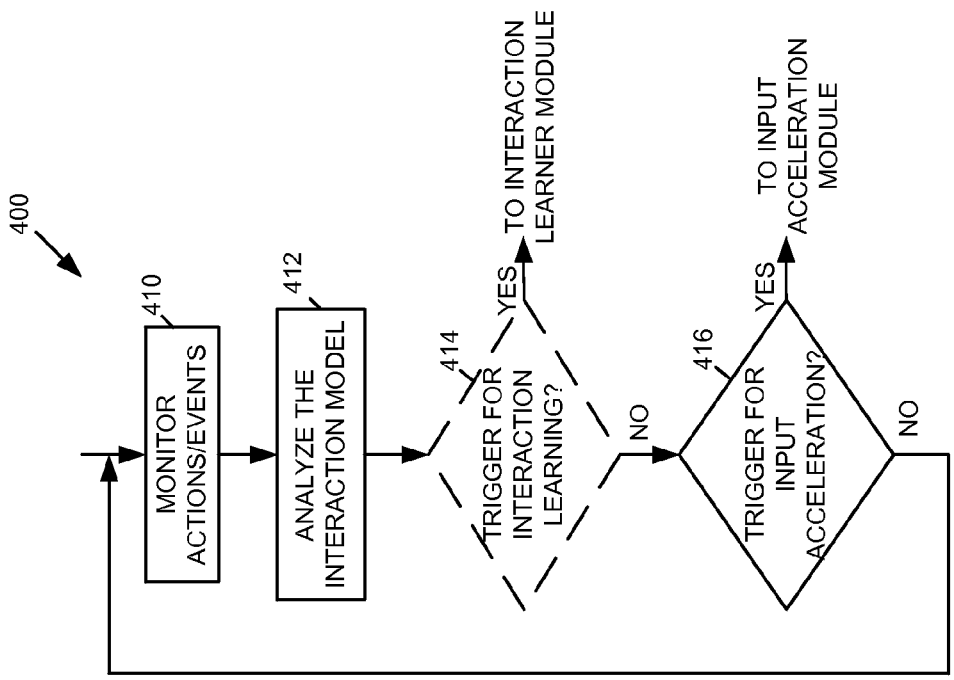
FIG. 4 is a simplified flow diagram for at least one embodiment of a method for monitoring, learning, and accelerating interactions with a computing device.

Referring now to FIG. 4, an illustrative method 400 executable as computerized programs, routines, logic and/or instructions by one or more of the various modules of the system 100 (e.g., the interaction monitoring module 112), to monitor interactions with the computing device, is shown. At block 410, the method 410 monitors interactions of various kinds with the computing device, including, potentially, system-level events that relate to software applications and user-level actions with a variety of different software applications, as described above. In some embodiments, interaction monitoring may run continuously (e.g., as a background process); while in other embodiments, an affirmative action of the user may be required to turn the interaction monitoring on or off.

At block 412, the method 400 analyzes any one or more aspects (e.g., knowledge stores) of the interaction model 120 to determine whether a given interaction (e.g., application- or system-level event or user action) is one that may be of interest for learning or acceleration purposes. For instance, as mentioned above, interactions that are considered less relevant to the current context may be ignored by the method 400. On the other hand, if a "match" is found between a monitored interaction and information contained in the interaction model 120, the method 400 may proceed to either block 414 or block 416.

At block 414, the method 400 determines whether to initiate interaction learning. Interaction learning may be initiated (and concluded) explicitly by the user (e.g., by activation of a user interface control, input of "start" and "end" control sequences, etc.), or implicitly by the system 100 (e.g., in response to the current interaction context and/or information in the interaction model 120). The interaction learner module 114 is invoked in response to the initiation of interaction learning. In some embodiments, interaction learning records and analyzes streams of interaction data received from instrumented software applications or from the interaction accelerator 110B. Analysis of the data streams is performed using one or more automated learning techniques. The aforementioned Bui et al., U.S. Patent Application Publication No. 2009/0307162 describes some examples of techniques for learning interactions utilizing computerized algorithmic learning processes, including inference methods, mixed initiative or active learning, synchronous and asynchronous question and answer techniques, and learning by using knowledge base queries (such as queries to the knowledge stores 122, 126) to complete workflows. These and/or other techniques may be used by the interaction learner module 114. However, the present disclosure is in no way limited to the foregoing techniques; rather, any similarly suitable automated learning methods may be used.

At block 416, the method 400 determines whether input acceleration should be initiated based on a monitored interaction or, more generally, the current interaction context. For example, input acceleration may be initiated if a monitored interaction corresponds to one or more interactions stored in the interaction patterns/templates 122, the user-specific learned interactions 126, and/or the contextual model 132.

In some embodiments, system utilization data (which may be obtained, e.g., from hardware 212 or systems software 214) is used to determine whether and when to automatically initiate, continue, or conclude input acceleration. For instance, in some embodiments, input acceleration may proceed if the computing device has a sufficient number or percentage of idle resources (e.g., in the range of about 15-40%, depending on the system configuration) but may be at least temporarily suspended of the system utilization is closer to capacity. Rules pertaining to system utilization may be embodied in the knowledge store 124.

The input acceleration module 116 is invoked if the method 400 determines based on the applicable criteria that input acceleration should be initiated. If the method 400 does not initiate either interaction learning or input acceleration, then the method 400 returns to block 410 and continues monitoring user actions and system- and/or application-level events. Although not specifically shown in FIG. 4, it should be appreciated by those skilled in the art that, in some embodiments, interaction monitoring can continue even while interaction learning or input acceleration proceeds (in other words, the monitoring of interactions can occur concurrently or in parallel with any interaction learning or input acceleration that may have been initiated or which is in progress. As such, in some embodiments, it is possible that multiple "threads" of input acceleration can be initiated within a short span of time. In such event, a later-initiated input acceleration process replaces the earlier-initiated input acceleration process(es) and modifies the earlier input acceleration processes to account for additional interaction data/inputs (e.g., applications, instructions/commands, parameters, arguments) that may be associated with the later interaction.

Predicting Interactions

Figure 5:
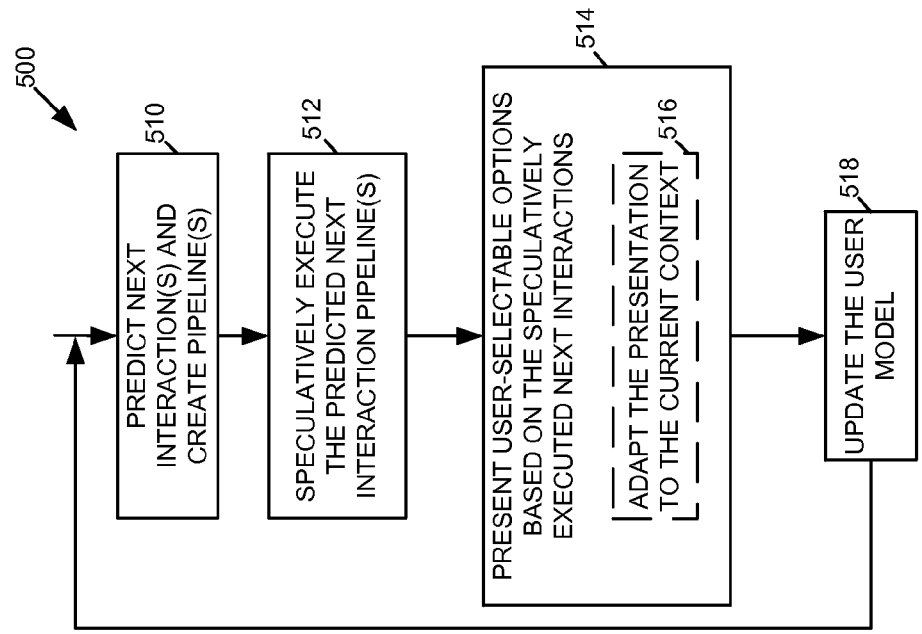
FIG. 5 is a simplified flow diagram for at least one embodiment of a method for predicting, speculatively executing, and presenting potential next interactions with a computing device.

Referring now to FIG. 5, an illustrative method 500 executable as computerized programs, routines, logic and/or instructions by one or more of the various modules of the system 100 (e.g., the input acceleration module 116), to predict and accelerate interactions with the computing device, is shown. In the illustrative embodiments, the method 500 is initiated at block 416 of FIG. 4 as described above.

At block 510, the method 500 predicts one or more interaction "pipelines," each of which represents an interaction or series of interactions that may be desired by the user, based on the current interaction context (which includes information gleaned from the interaction monitoring of block 410 of FIG. 4 and/or the interaction model 120, as discussed above). For instance, in some embodiments, the method 500 determines, based on the interaction model 120, a number of stored interaction pipelines (e.g., patterns, templates, or learned interactions) that contain or match at least a portion of a currently monitored interaction, and "follows" each of the matched stored interaction pipelines to predict next interactions or interaction pipelines. In other words, prediction of a subsequent interaction can involve predicting (e.g., concurrently) multiple interaction pipelines and/or predicting subsequent interactions within a given interaction pipeline.

The aforementioned Bui et al., U.S. Patent Application Publication No. 2009/0307162 describes some examples of techniques for comparing monitored interaction data to stored patterns or templates. Those techniques and/or others may be used by the method 500, but the method 500 is not limited thereby. Other similarly suitable techniques may be used equally as well.

In some embodiments, semantic information associated with a monitored interaction may be analyzed and compared with associations stored in the semantic model 128 to determine a next logical interaction. In some embodiments, where there are multiple possible subsequent interaction pipelines or multiple possible subsequent interactions in a given pipeline, the probabilistic model 130 may be accessed to determine which of the possibilities may be the most suitable candidates.

In some embodiments, the contextual model 132 may be accessed to determine previous interactions that may be relevant to the current interaction context and/or to determine previous interactions that may be appropriate or useful for predicting next interactions or next interaction pipelines. For example, the STM 134 may be accessed to determine (e.g., at a semantic level) various interactions that the user is currently performing or has recently performed at the computing device (potentially involving multiple different software applications). The interaction patterns/templates 122 and/or the user-specific learned interactions 126 then may be accessed to look for a pattern, template, or learned interaction or interaction pipeline that includes or closely matches one or more of the interactions or interaction pipelines determined from the STM 134. If a pattern, template, or learned interaction or is found in the knowledge store 122 or the knowledge store 126 that includes or closely matches one or more of the interactions or interaction pipelines obtained from the STM 134, then one or more next interactions or interaction pipelines may be predicted, in view of one or more interactions that follow the matching interaction in the matching pattern, template, or learned interaction.

In some embodiments, interactions or interaction pipelines may be predicted based on implicit or passive behavior of the user with respect to the computing device. For instance, the computing device may be equipped with a proximity sensor that can monitor the user's movements even though the user may not be physically contacting the computing device. As an example, a proximity sensor may detect that a person's hand or finger is moving closer to or farther away from a particular control, application window, or content displayed on a display screen of the computing device.

Based on the inputs from the proximity sensor, the predicted interactions or interaction pipelines can be "localized" based on the user's movements or projected movements toward or away from such display elements. For instance, if multiple windows are currently open on the display (e.g., a calendar window, an email window, a document processing window, and a web browser), and the proximity sensor determines that the user's hand is moving toward the web browser window (and away from the other windows), the predicted interactions may include a number of possible interaction pipelines, each of which involves use of the web browser, but with each pipeline involving a different combination of inputs (e.g., parameters and/or arguments).

As noted above, an "interaction pipeline" includes a number of atomic interactions (e.g., user actions, system-level events, and/or application-level events) that are executable in a logical order (e.g., sequentially) by the computing device in an automated fashion (e.g., on behalf of the user, or without the user's explicit or "active" involvement). Interactions in a pipeline are generally those that logically follow one another according to a stored interaction pattern or template or a learned interaction, for example. In some cases, the interaction pipeline may include interactions that use, as inputs, the output of one or more prior interactions in the pipeline, or data from other pipelines. Alternatively or in addition, one or more interactions in a pipeline may use, as inputs, the same inputs as other interactions or pipelines.

Figure 6:
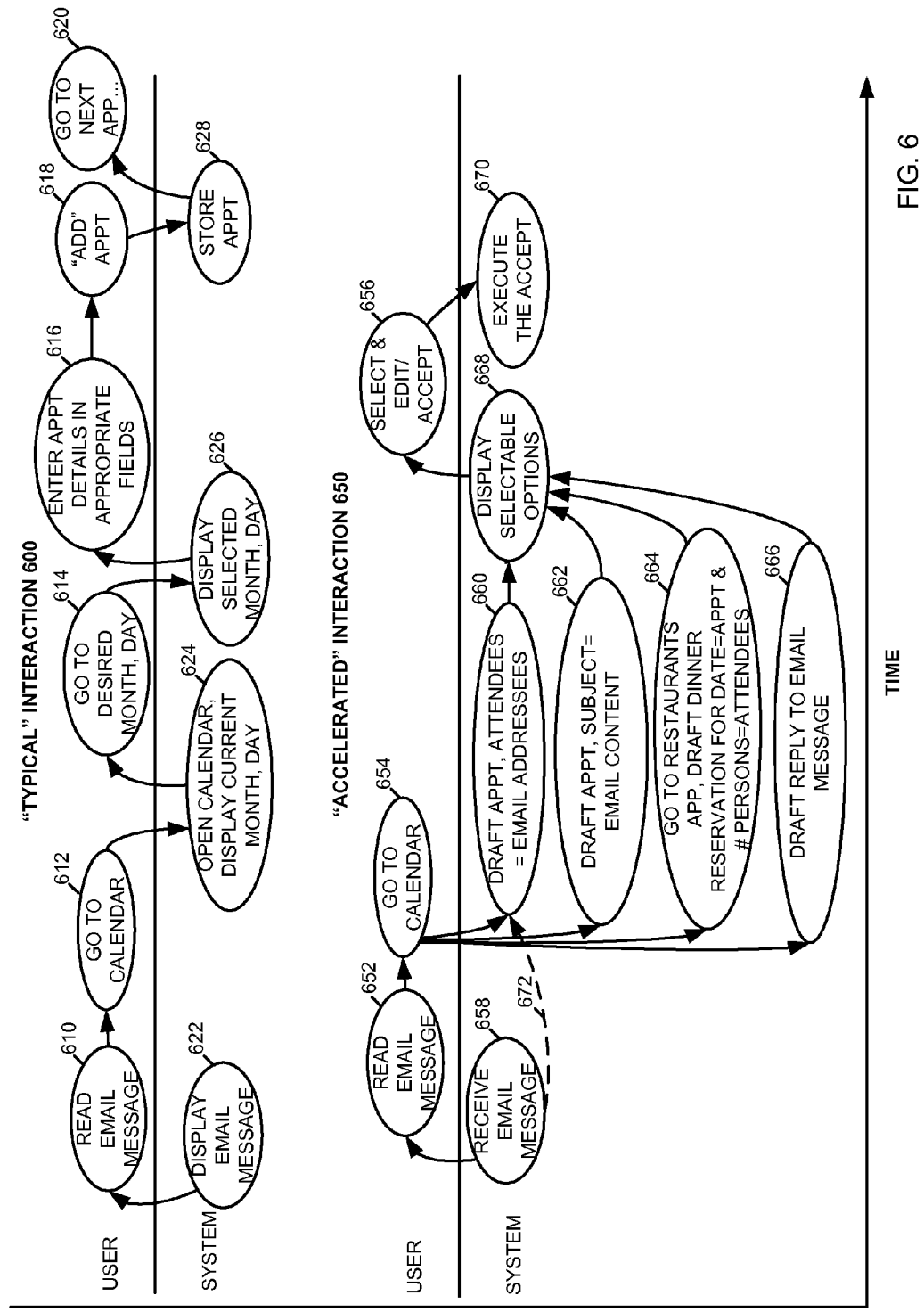
FIG. 6 is a simplified illustration comparing an exemplary "typical" interaction, and an exemplary "accelerated" interaction that may be generated by at least one embodiment of the system of FIG. 1.
Figure 7:
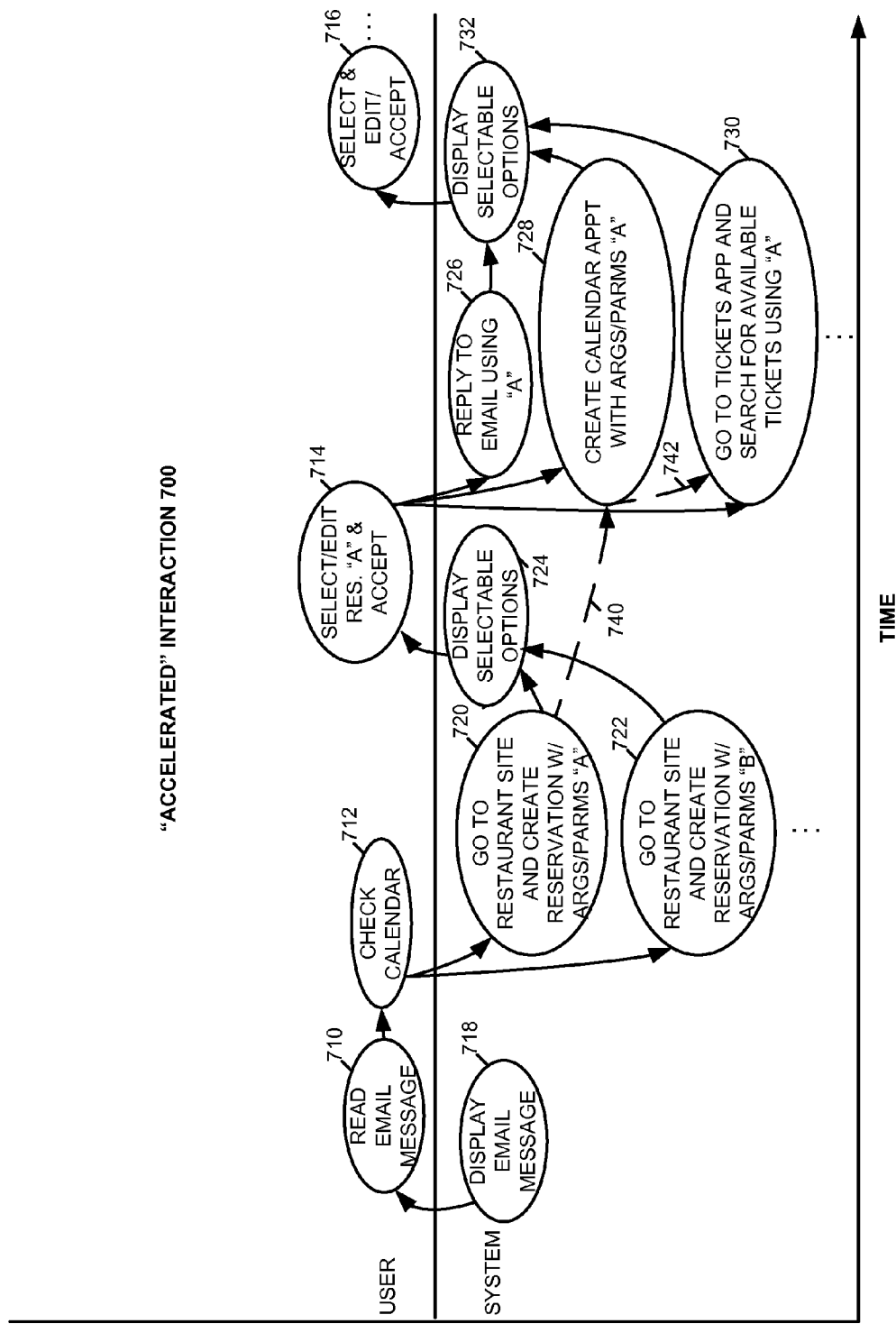
FIG. 7 is a simplified illustration of another exemplary "accelerated" interaction that may be generated by at least one embodiment of the system of FIG. 1.

Some examples of interaction pipelines that can be automated by the system 100 are shown in FIGS. 6 and 7. Referring to FIG. 6, an exemplary predicted next interaction pipeline 660 involves the following atomic interactions: opening a new calendar appointment and inserting the name of the sender of the email message read by the user at interaction 652 into the attendee field of the appointment form. As shown by the dashed arrow 672, the system 100 may "pre-cognitively" (e.g., before the user becomes aware of the email message) proceed directly from the system-level interaction of receiving an email message 658 to the predicted interaction 660 (e.g., based on the content of the email message and/or other aspects of the current interaction context), in some embodiments.

Similarly, an exemplary next interaction pipeline 662 involves opening a new calendar appointment, inserting the email sender's name into the attendee field, and inserting the content of the email message into the description field of the appointment. An exemplary interaction pipeline 664 involves launching a restaurant reservations application. On a mobile device, this may involve simply activating an icon associated with the restaurant reservations application. On a desktop or laptop device, however, it may require launching a web browser and entering the Uniform Resource Locator (URL) for the restaurant reservations application (e.g., opentable.com or similar), for example. The interaction pipeline 664 also involves using the restaurant reservations application to create a dinner reservation based on information contained in the email message of interaction 652 and/or information contained in the calendar appointment of interaction 660 or interaction 662. Another exemplary next interaction pipeline 666 involves returning to the email application and initiating a reply to the email message of interaction 652. The interaction pipeline 666 may further involve incorporating data from the results of the interaction 664 into the email reply (e.g., the dinner reservation details). Referring to FIG. 7, exemplary predicted next interactions 720, 722, 726, 728, and 730 each similarly involve a "pipeline" of atomic interactions.

Speculatively Executing Interactions

Referring further to FIG. 5, the method 500 begins "speculatively" executing each of the predicted interaction pipelines generated at block 510, described above, in response to the current interaction context. In general, this means that the predicted interaction pipelines are at least partially executed (e.g., in an automated fashion, by the input acceleration module 116) even though the method 500 does not yet know whether the user desires them to be executed. In some embodiments, intelligence gleaned from the interaction model 120 may be used by the method 500 to direct the speculative execution process. For example, the number of predicted next interactions that are speculatively executed may be determined based on the current interaction context and/or other factors.

Some embodiments of the method 500 may compute or estimate the time required for a user to perform an interaction manually, compare the computed or estimated time to a computed or estimated time for the system 100 to perform the same interaction, and then, based on the time required for user performance (e.g., if the time for the user to perform is significantly longer than the time it would take for the system 100 to perform the same interaction), proceed with execution of the interaction with or without affirmation from the user. Such a feature may be useful in contexts in which time limits are desired or imposed on users for completing an interaction, for example, during the purchase of theatre or concert tickets through an online ticket broker, financial transactions, and online auctions.

More generally, in some embodiments the method 500 is implemented using program optimization techniques, parallel processing techniques (which may enable portions of the method to run on parallel hardware, for example), and/or other techniques for expediting the speculative execution process so that the predicted next interaction pipelines can be presented to the user in a timely manner (e.g., while they are still relevant to the current interaction context).

For instance, in accordance with the pipelining paradigm, it is not always necessary for predicted next interactions or interaction pipelines to fully complete before other predicted interactions or pipelines begin executing. Predicted interactions and/or interaction pipelines can execute concurrently in some embodiments. Where multiple predicted interaction pipelines use the same inputs, embodiments of the method 500 can begin executing a subsequent interaction as soon as the required inputs are available (e.g., as soon as another interaction completes its memory access), rather than waiting until execution of the other interaction has finished.

Further, in accordance with a "branch prediction" paradigm, where the speculative execution involves executing multiple interactions or interaction pipelines of the same type with different parameters or arguments, for example, it is not always necessary for the method 500 to wait for affirmation from the user as to the actual desired parameters or arguments (or to wait for some other condition to be satisfied). Rather, some embodiments of the method 500 are configured to make a determination as to which "branch" (e.g., interaction pipeline and combination of parameters or arguments) may be the most suitable given the current interaction context and/or other factors, and based on that determination, begin executing that pipeline in an automated fashion.

While speculative execution of the predicted interactions can theoretically continue until an interaction pipeline is fully executed, as discussed above, interaction pipelines are typically only executed to a point that would be acceptable to the user. Further, as it is not yet known whether the user actually desires the predicted interaction, predicted interactions are typically executed only to a point at which they remain innocuous or reversible if not selected by the user.

Some examples of interactions that can be speculatively executed include conducting an online search (e.g., using an Internet search engine or a local search mechanism such as a document search or email "find" feature), following a URL, inserting data into appropriate fields of a fill-in form, opening an email message or document, launching a software application, and/or others. For instance, speculative execution may include automatically preparing a suggested reply to an email message or filling out an online form, but not sending the reply or submitting the form without the user's approval.

Moreover, in some embodiments, usability studies and/or other information may indicate user preferences of various populations, which may be applied to the speculative execution. For instance, in some populations, users may find it disconcerting if a computing device executes more than two or three interactions without prompting the user for input. As such, speculative execution may be subject to such limits in some embodiments.

Interactive Representations

Referring further to FIG. 5, the method 500 generates the user-selectable representations 150, which embody the speculatively-executed predicted interactions, at block 514. Inasmuch as the speculatively-executed predicted interactions are not likely to have been fully executed, the interactive representations 150 embody the results of the speculatively-executed interactions up to the point at which execution was at least temporarily suspended (e.g., pending user approval), in some embodiments. For instance, in some embodiments, the arguments and/or parameters associated with a speculatively-executed interaction may be concatenated and stored in a string variable associated with a thumbnail image (or graphical icon, user interface control or other suitable indicator) that represents the speculatively-executed interaction, such that if the thumbnail image is selected by the user, the string can be parsed and execution of the interaction can continue with the appropriate arguments and/or parameters.

In some embodiments, the interactive representations 150 may be pre-constructed by monitoring running applications and saving snapshots of prior executions of the predicted interactions in the interaction model 120. For example, a thumbnail image representing the home page of an entity may be constructed from a saved snapshot (e.g., a screen capture) of a prior visit to the entity's homepage. Similarly, a thumbnail image representing a software application may be constructed from a saved snapshot of a prior interaction with the software application. Although not directly corresponding to the output of a current speculatively-executed predicted next interaction, such a thumbnail should be sufficient to allow the user to identify the speculatively-executed predicted next interaction, especially when the image is reduced in size and fidelity to create the thumbnail image.

In other embodiments, particularly embodiments using instrumented applications and/or the interaction accelerator middleware 110B, thumbnail images may be generated from a complete description of the speculatively-executed interaction's execution state. In such embodiments, information corresponding to the current interaction context may be associated with the thumbnail image. Generally speaking, the presentation of the predicted interactions and/or the interactive representations may take any suitable form of which the system 100 is capable, including but not limited to textual, graphical, and/or audio output. Accordingly, user selection of any one of the representations 150 may be accomplished in any way of which the system 100 is capable, including clicking, touching, pointing, gestures, motion, gaze, or any other suitable selection or activation methods (e.g., active/explicit or passive/implicit methods). For example, U.S. patent application Ser. No. 13/399,210 to Senanayake et al., filed Feb. 17, 2012, describes a "heads up display" input device that may be used in some embodiments.

Referring to block 516, in some embodiments, information relating to the current interaction context may be used to inform the method 500's mode of presenting the user-selectable representations 150 to the user. In other words, the method 500 may determine how to present the representations 150 based on the current interaction context. For instance, in some embodiments, some of the interactive representations 150 may be presented more prominently (in terms of, e.g., ordering, location, sizing, highlighting, color, etc.) than others to reflect a likelihood of the corresponding predicted interaction being desired by the user, as determined by the method 500, and such presentations may be adjusted in real time as the current interaction context changes.

As discussed above, in some embodiments, inputs from hardware devices, such as sensors, may be incorporated into the current interaction context. In some embodiments, one or more optical sensors driven by gaze tracking technology incorporated into the system 100 may track the user's gaze relative to various locations on a display screen of the computing device. Depending on the location of the user's focus (as determined by, e.g., optical sensors), the method 500 may adjust the presentation of the interactive representations 150.

For example, if it appears to the gaze tracking technology that the user's attention is directed to a particular representation 150, the method 500 may increase the prominence of that representation 150 (e.g., by fish bowl zooming or foregrounding) while, potentially, decreasing the prominence of other representations 150. Some illustrative examples of gaze tracking technology that may be incorporated into the system 100 are described in U.S. patent application Ser. No. 13/158,109 to Senanayake et al, filed Jun. 10, 2011, and U.S. patent application Ser. No. 13/399,210 to Senanayake et al, filed Feb. 17, 2012; however, this disclosure is not limited thereby. Other suitable gaze tracking technology may be used equally as well.

The presentation of user-selectable representations 150 may similarly be adjusted in real time in response to inputs from proximity sensors of the computing device (e.g., in response to a user's movement toward or away from specific portions of a display). The foregoing describes some examples in which the method 500 can adapt the presentation of the representations 150 based not only on explicit or "active" interactions of the user, but also in response to implicit or "passive" user interactions with the computing device, such as those that may be detected by gaze tracking, proximity sensing, and/or other sensing technologies.

Figure 8:
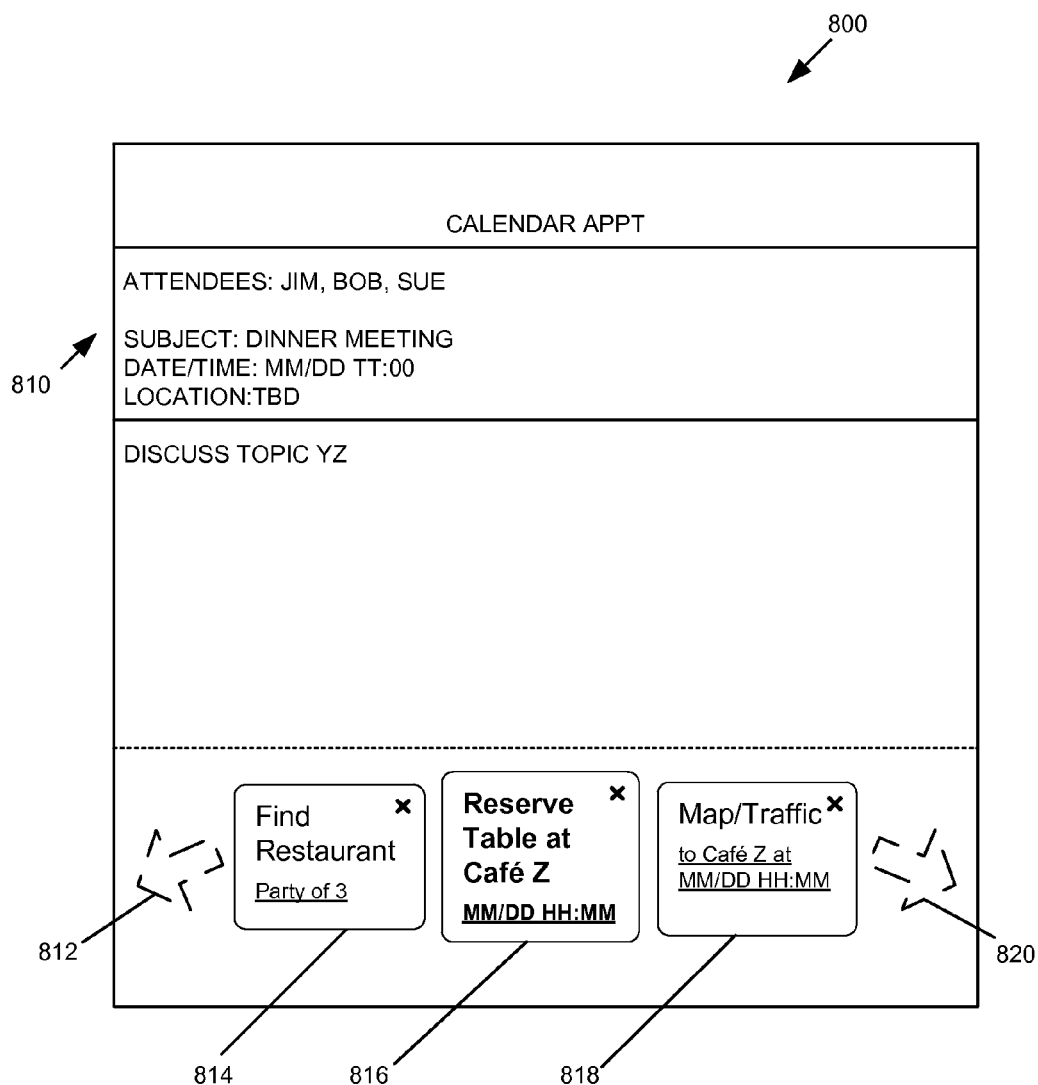
FIG. 8 is a simplified elevational view of an exemplary user interface that may be displayed at a computing device in connection with at least one embodiment of the system of FIG. 1.
Figure 9:
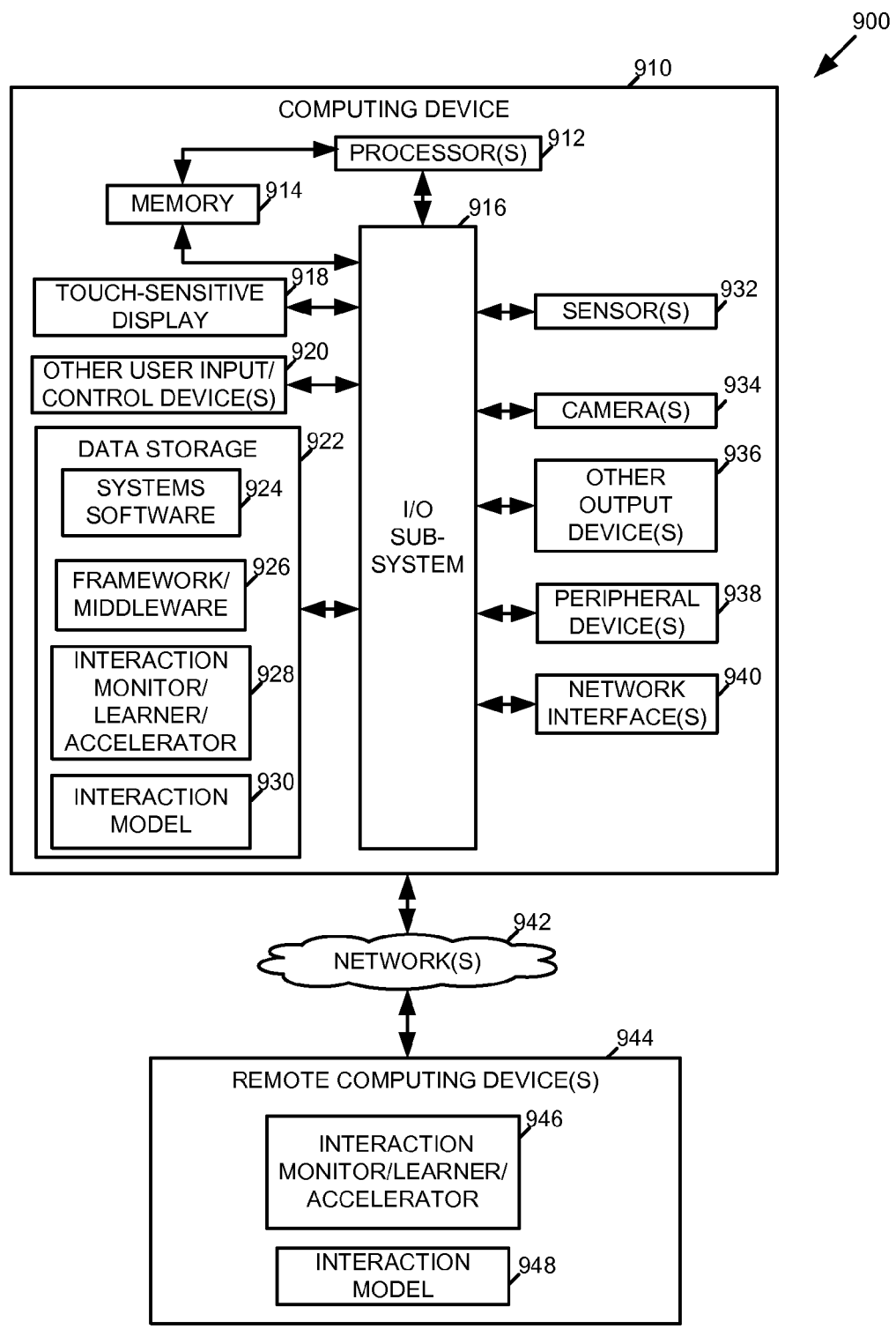
FIG. 9 is a simplified block diagram of an exemplary computing device in connection with which at least one embodiment of the system of FIG. 1 may be implemented.

Referring now to FIG. 8, an exemplary embodiment of interactive representations 150 is shown. The illustrative display 800 is a display screen of a computing device. The display 800 includes a portion 810 that displays information relating to a prior or current interaction with the computing device (e.g., a calendar appointment). User-selectable representations 814, 816, 818, generated by the input acceleration module 116 as described above, are displayed in an area of the display 800 that overlays part of the display portion 810. The interactive representation 816 is displayed more prominently than the representations 814, 818, thereby reflecting a judgment made by the method 500 that the predicted interaction corresponding to the representation 816 is more likely than the others to be desired by the user, as discussed above.

In the illustrative embodiment, the representations 814, 816, 818 are arranged in order according to inputs that are required by the speculative execution of the corresponding predicted interactions. The first representation 814 listed in left-to-right order embodies an interaction that involves using a mobile device application to find a restaurant that has a table available for a party of three on the date indicated in the calendar appointment (where the "party of three" input is derived from the list of attendees on the calendar appointment). In other words, the representation 814 embodies the speculative execution of the "Find Restaurant" mobile application using the calendar appointment data as inputs.

The next representation 816 listed in left-to right order corresponds to a predicted interaction that also uses as inputs the date and "party of three" information gleaned from the calendar appointment and involves the "Find Restaurant" mobile application. The interaction 816 also uses as inputs some of the results of the speculative execution of the interaction 814—namely, the name of a restaurant found as a result of the speculative execution of the interaction 814 and the time at which the restaurant was determined by the speculative execution of the interaction 814 to have a table available for a party of three.

The interactive representation 818 corresponds to a predicted interaction that uses inputs from the calendar appointment, the interaction 814 and the interaction 816. That is, the interaction 818 applies the information accumulated during speculative execution of the interactions 814 and 816 (indicating that a reservation has been made at a particular restaurant at a particular date and time) to predict a subsequent interaction that involves generating a map or driving directions and traffic information for the user's travel to the identified restaurant at the specified time. In this example as well as others, the system 100 is able to relieve the user of the task of re-entering or "copying and pasting" inputs that are already available to the computing device (as having been entered by the user or generated by the system in other applications or at other locations on the user interface).

In some embodiments, for example on computing devices having small display screens (such as smartphones and other mobile electronic devices), the display area for the user-selectable representations 150 may be scrollable, so that all of the representations 150 need not be displayed at the same time. As indicated by the graphical arrows 812, 820 (which may be embodied as user interface controls), the display 800 may be configured to scroll the user-selectable representations (e.g., 814, 816, 818) in an angular fashion (e.g., to simulate a rotating tray or 'lazy susan' type apparatus). In other embodiments, more conventional horizontal (or vertical, in other embodiments) scrolling may be used.

Upon selection/activation of a user-selectable representation 150 by the user, execution of the predicted interaction may continue automatically or upon a further explicit approval by the user (as may be the case in interactions that involve financial transactions, for example). User-selectable representations 150 that are not selected by the user (and/or data relating thereto) may be stored in the interaction model 120 for future consideration by the system 100 or discarded, while the results of the speculative execution of the unselected predicted next interactions may be canceled, deleted, cleared, or otherwise nullified according to the conventions of the particular software application(s) involved.

Referring further to FIG. 5, at block 518, the method 500 updates the interaction model 120 in accordance with the results of the presentation of the user-selectable representations 150. In some embodiments, the user's responses to the options presented at block 514 are analyzed by the system 100 in order to adaptively modify one or more aspects of the interaction model 120. For instance, in some embodiments, likelihood scores or probabilities associated with interaction patterns or templates stored in the knowledge store 122 and/or learned interactions stored in the knowledge store 126 may be updated based on the selection (or lack thereof) made by the user at block 514. Following block 518, the illustrative method 500 returns to block 510, where interaction acceleration may be performed based on the new current interaction context, which may include interaction(s) that occurred at block 518 and/or other interactions monitored by the system 100.

Input Acceleration Examples

Referring again to FIGS. 6 and 7, examples of "accelerated" interactions 650, 700 are shown in comparison to a more "typical" interaction 600 (in which interaction acceleration has not been applied). Referring to FIG. 6, the typical interaction 600 includes a number of user-performed interactions 610, 612, 614, 616, 618, 620, and a number of system- or application-level interactions 622, 624, 626. The typical interaction 600 shows that a number of interactions with a computing device can be required to execute even simple tasks, such as adding a new appointment to an online calendar. In addition, the amount of time required to complete a multiple-interaction task is proportional to the number of interactions that are required by the task.

The "accelerated" interaction 650 also includes a number of user interactions 652, 654, 656, and a number of system-level interactions 658, 660, 662, 664, 666, 668, 670; however, the number of user interactions is reduced as a result of the interaction acceleration. A number of interaction pipelines 660, 662, 664, 666 are predicted in response to the "go to calendar" interaction 654.

Each of the interaction pipelines 660, 662, 664, 666 is predicted based on the current interaction context, which may include the system's activity of receiving a new email message (658) and/or the user's activity of reading the email message (652) and accessing a calendar application (654). Once the user-selectable representations of each of the predicted interaction pipelines 660, 662, 664, 666 are presented (at 668), the user simply selects the desired next interaction, edits the input data as may be needed, and accepts the interaction (656). In response, the system completes the execution of the accepted interaction (670) (e.g., by saving a new calendar appointment to memory, saving a dinner reservation to memory, or sending a reply to the email message).

The branch prediction techniques discussed above can be used to limit the number of predicted interactions to those deemed most likely to be relevant to the current interaction context, and/or to similarly limit the number of speculatively-executed interactions. Moreover, the pipelining techniques discussed above can be used to increase the throughput of the interaction accelerator 110. For example, any of the predicted interaction pipelines 662, 664, 666 may begin executing as soon as the interaction pipeline 660 is finished accessing the read email message, and the predicted pipelines can be executed in any suitable order.

Referring to FIG. 7, the exemplary "accelerated" interaction 700 illustrates an interaction pipeline that includes multiple instances of input acceleration. As in the above examples, the accelerated interaction 700 includes a number of user-performed interactions 710, 712, 714, 716 and a number of system- or application-level interactions 718, 720, 722, 724, 726, 728, 730, 732. In response to the current interaction context (which may include, among other things, the interactions 718, 710, 712), at least the predicted interactions 720, 722 are generated by the system using arguments and/or parameters gleaned from the current interaction context. (e.g., the read email message).

In this example, the predicted interactions 720, 722 involve the same software application and task (create a dinner reservation) but different arguments and/or parameters (e.g., input data). Hypothetically, at interaction 714, the user selects the option corresponding to the predicted next interaction 720. The predicted interaction 720 involves creating a restaurant reservation using a particular combination of arguments and/or parameters "A," some of which may have been obtained from the original email message and others of which may be determined during the process of speculatively executing the interaction 720.

For example, the arguments and/or parameters "A" may include the name of a restaurant contained in the original email message as well as date, time, and number of persons information generated during speculative execution of the interaction 720. In response to the user's selection of reservation "A" (714), the system 100 uses the parameter/argument combination "A" as input to the next iteration of input acceleration (which generates at least the predicted next interactions 726, 728, 730).

The dashed arrow 740 illustrates that in some embodiments, branch prediction techniques may be employed to determine that the user is highly likely to accept the reservation "A," that the potential adverse effect of the system doing so on behalf of the user if the user does not agree is minimal or easily reversible, and that interaction 728 is the most likely next interaction to follow the interaction 720. In such event, the system 100 may proceed, at least speculatively, directly from interaction 720 to interaction 728 (e.g., without the user's direct involvement) rather than from interaction 720 to interactions 724, 714.

Similarly, the dashed arrow 742 indicates that in some embodiments, the system 100 may determine, based on the current interaction context, that the next most likely interaction desired by the user after creating the calendar appointment "A" (728) is to go ahead and look for available tickets (e.g., for a movie following dinner). If the system 100 determines that the potential adverse effect of the system doing so on behalf of the user is minimal or easily reversible, the system 100 may at least speculatively proceed directly (e.g., without the user's involvement) from interaction 728 to interaction 730.

Implementation Examples

Referring now to FIG. 9, an illustrative embodiment 900 of the system 100 is shown. Portions of the system 900 are embodied in a computing device 910. Portions of the system 900 may be embodied as a stand-alone software application or may be embedded in or accessed by one or more other applications. For example, portions of the system 900 may be incorporated into other systems or interactive software applications. Such applications or systems may include, for example: operating systems, middleware or framework software, and/or applications software. Further, the system 900 may be local to a particular computing device 910, or portions of the system 900 may be distributed across multiple computing devices 910, 944.

The illustrative computing device 910 includes at least one processor 912, memory 914, and an input/output (I/O) subsystem 916. In the illustrative embodiment, the computing device 910 is embodied as a personal electronic device such as a mobile or handheld computing device, smartphone, personal digital assistant, laptop computer, tablet computer, or desktop computer. In other embodiments, the computing device 910 may be embodied as any type of computing device such as a server, an enterprise computer system, a network of computers, a combination of computers and other electronic devices, or other electronic device.

The illustrative processor 912 includes one or more processor cores (e.g. microprocessors) (but typically at least two cores). Although not specifically shown, it should be understood that the I/O subsystem 916 typically includes, among other things, an I/O controller, a memory controller, and one or more I/O ports. The processor 912 and the I/O subsystem 916 are communicatively coupled to the memory 914. The memory 914 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The I/O subsystem 916 is communicatively coupled to at least one touch-sensitive display 918 (e.g., a touchscreen, virtual keypad, etc.), one or more other input or user control devices 920 (e.g., a physical keyboard or keypad, a microphone, hardpanel controls, etc.), at least one data storage 922, one or more sensors 932 (e.g., proximity sensors, accelerometers, etc.), at least one camera or optical sensor (e.g., a multi-camera sensor system) 934, other output devices 936 (e.g., a speaker, LED, display screen, etc.), one or more other peripheral devices 938 (e.g., GPS transceiver, sound, graphics or media adaptors, etc.), and at least one network interface 940.

The network interface 940 communicatively couples the computing device 910 to one or more remote computing devices 944 via one or more networks 942. The network(s) may include a local area network, wide area network, personal cloud, enterprise cloud, public cloud, and/or the Internet. Accordingly, the network interface 940 may include a wired or wireless Ethernet adapter, Wi-Fi adapter or other suitable device(s) as may be needed, pursuant to the specifications and/or design of the particular network(s) 940. The remote computing device(s) 944 may be embodied as any suitable type of computing device such as, for example, a server, an enterprise computer system, a network of computers, a combination of computers and other electronic devices, or other electronic devices.

The data storage 922 may include one or more hard drives or other suitable data storage devices (e.g., memory cards, memory sticks, and/or others). In the illustrative embodiment, portions of systems software (e.g., an operating system, etc.) 924, framework/middleware (e.g., APIs, object libraries, etc.) 926, interaction monitor/learner/accelerator 928, and interaction model 930 reside in the data storage 922. Portions of the systems software 924, the framework/middleware 926, the interaction monitor/learner/accelerator 928, and the interaction model 930 may be copied to the memory 914 during operation, for faster processing or other reasons. Further, in some embodiments, portions of any of the systems software 924, the framework/middleware 926, the interaction monitor/learner/accelerator 928, and the interaction model 930 are specially configured for use in connection with a particular hardware platform or configuration, such as a particular implementation of a mobile computing device or a particular mobile computing device operating system.

In some embodiments, the interaction monitor/learner/accelerator 928 may include a local portion 928 (which may include a client application or front-end user interface and a back end or server application) and a remote portion 946 (which may similarly include portions of the client application or front-end user interface and back end or server application). Similarly, the interaction model 930 may include aspects that are local to the computing device 910, such as user-specific learned interactions, while other aspects 948 of the interaction model are located remotely and accessible via the network(s) 942. For example, some aspects of the interaction model 930 that may be stored remotely include interaction patterns and templates and/or learned interactions that may have applicability to a broader population of users. Such interaction patterns, templates, and/or learned interactions may, for instance, be uploaded to an "app store" or "market" for sharing, sale or exchange with other computing device users.

The computing device 910 may include other components, sub-components, and devices not illustrated in FIG. 9 for clarity of the description. In general, the components of the computing device 910 are communicatively coupled as shown in FIG. 9, by one or more signal paths, which are represented schematically as bidirectional arrows. Such signal paths may be embodied as any type of wired or wireless signal paths capable of facilitating communication between the respective devices and components. For example, the signal paths may be embodied as any number of wires, wireless communication channels, intervening devices, and/or other components.

General Considerations

In the foregoing description, numerous specific details are set forth in order to provide a more thorough understanding of the present disclosure. It will be appreciated, however, by one skilled in the art that embodiments of the disclosure may be practiced without such specific details. In some instances, details such as control structures and full software instruction sequences have not been shown in order not to obscure the disclosure. Those of ordinary skill in the art, with the included descriptions, should be able to implement appropriate functionality without undue experimentation.

References in the specification to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and/or others.

In the drawings, specific arrangements or orderings of schematic elements, such as those representing devices, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks or modules may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C#, C++, and/or other programming languages.

Similarly, schematic elements used to represent data or information may be implemented using any suitable electronic arrangement or structure, such as a database, data store, table, record, array, index, hash, map, tree, list, graph, file (of any file type), folder, directory or other grouping of files, header, web page, meta tag, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association exists. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths, as may be needed, to effect the communication.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure may be described in the context of particular forms of computing devices and systems, it should be understood that the various aspects have other applications, for example, in other computing devices or in any application in which it is desired to improve the human-computer system interface.

The invention claimed is:

1. A method for accelerating user interaction with a computing device, comprising:
    monitoring a current interaction context of the computing device, the current interaction context involving at least one current software application;
    predicting a plurality of interactions with the computing device, including one or more inputs used in the predicted interactions, based on the current interaction context, at least one of the predicted interactions involving a different software application than the current software application;
    speculatively executing each of the predicted interactions using a predicted input in response to the current interaction context, including executing the same predicted interaction multiple times using at least one different input each time; and
    presenting, at the computing device, a user-selectable representation of each of the speculatively executed predicted interactions.

2. The method of claim 1, wherein the current interaction context relates to at least one interaction with the at least one current software application, comprising comparing the at least one interaction with a stored interaction model comprising data relating to a plurality of interactions with software applications.

3. The method of claim 2, wherein the interaction model comprises data relating to a plurality of interaction patterns comprising at least one of pre-defined interaction patterns, learned interaction patterns generated by a computerized algorithmic learning process and a plurality of user-specific interactions observed by the computing device.

4. The method of claim 1, wherein the plurality of predicted interactions includes an interaction that involves a software application and at least one parameter or argument and another interaction involving the same software application and at least one different parameter or argument.

5. The method of claim 1, wherein at least one of the predicted interactions comprises a sequence of multiple interactions that can be executed by the computing device in an automated fashion on behalf of a user.

6. The method of claim 1, comprising at least temporarily suspending the execution of a predicted interaction prior to completing the predicted interaction.

7. The method of claim 6, wherein the user-selectable representation of the at least one predicted interaction is selectable to continue executing the at least one temporarily suspended predicted interaction.

8. The method of claim 1, comprising speculatively executing a predicted interaction and speculatively executing another predicted interaction prior to completing execution of the predicted interaction.

9. The method of claim 1, comprising receiving a selection of one of the user-selectable representations and repeating the predicting, speculatively executing, and presenting based on the selection.

10. The method of claim 9, comprising updating an interaction model based on the selection, wherein the interaction model comprises data relating to a plurality of interactions.

11. The method of claim 1, comprising determining an amount of time associated with user performance of at least one of the predicted interactions and speculatively executing the at least one predicted interaction based on the amount of time.

12. The method of claim 1, comprising executing different predicted interactions using a different input in the execution of each different predicted interaction.

13. A computing device comprising:
    at least one processor; and
    computer circuitry coupled to the at least one processor, the computer circuitry being arranged to cause the at least one processor to:
    monitor a current interaction context of the computing device, the current interaction context involving at least one current software application;
    predict a plurality of interactions with the computing device, including one or more inputs used in the predicted interactions, based on the current interaction context, at least one of the predicted interactions involving a different software application than the current software application;
    speculatively execute each of the predicted interactions using a predicted input in response to the current interaction context, including to execute the same predicted interaction multiple times using at least one different input each time; and
    present at the computing device a user-selectable representation of each of the speculatively executed predicted interactions.

14. The computing device of claim 13, wherein the computing device is a personal handheld computing device.

15. At least one non-transitory machine-accessible storage medium comprising a plurality of instructions that in response to being executed result in a computing device:
    monitoring a current interaction context of the computing device, the current interaction context involving at least one current software application;
    predicting a plurality of interactions with the computing device, including one or more inputs used in the predicted interactions, based on the current interaction context, at least one of the predicted interactions involving a different software application than the current software application;
    speculatively executing each of the predicted interactions using a predicted input in response to the current interaction context, including executing the same predicted interaction multiple times using at least one different input each time; and
    presenting, at the computing device, a user-selectable representation of each of the speculatively executed predicted interactions.

16. A method for learning and accelerating user interaction with a computing device, comprising:
    maintaining an interaction model comprising data relating to user interactions with the computing device in relation to one or more software applications;
    monitoring a current interaction context of the computing device;
    learning an interaction involving one or more software applications;
    storing data relating to the learned interaction in the interaction model;
    based on the current interaction context and the interaction model, predicting a plurality of interactions with the computing device, including one or more inputs used in the predicted interactions;
    speculatively executing each of the predicted interactions using a predicted input in response to the current interaction context, including executing the same predicted interaction multiple times using at least one different input each time; and presenting, at the computing device, a user-selectable representation of each of the speculatively executed predicted interactions.

17. The method of claim 16, comprising detecting a user-specified beginning of an interaction to be learned and detecting a user-specified end of the learned interaction.

18. The method of claim 16, comprising determining, in an automated fashion based on the current interaction context, a beginning and an end of the learned interaction.

19. The method of claim 16, comprising generalizing the learned interaction for applicability to interaction contexts that are different from the current interaction context.

20. A computing device, comprising:
a processor;
at least one optical sensor;
an output device; and
memory coupled to the processor, the memory having stored therein:
at least a portion of an interaction model, the interaction model comprising data relating to user interactions with the computing device in relation to one or more software applications; and
at least one computer-executable module configured to:
monitor a current interaction context of the computing device, the current interaction context defined at least in part by information derived from the at least one optical sensor;

based on the current interaction context, predict a plurality of interactions with the computing device, including one or more inputs used in the predicted interactions, each interaction involving at least one software application;

speculatively execute the predicted interactions in response to the current interaction context, including executing the same predicted interaction multiple times using at least one different input each time; and present, at the output device, a user-selectable representation of each of the speculatively executed predicted interactions.

21. The computing device of claim 20, wherein the at least one computer-executable module is configured to modify the predicted interactions in response to information derived from the at least one optical sensor.

22. The computing device of claim 20, wherein the information derived from the at least one optical sensor relates to implicit behavior of a person with respect to the computing device, and the implicit behavior involves a portion of the person not explicitly interacting with the computing device.

23. The computing device of claim 20, wherein the at least one computer-executable module is configured to update the presentation of user-selectable representations based on the implicit behavior.

24. The computing device of claim 20, wherein the computing device is a personal handheld computing device.

* * * * *